W. H. HARRIS.
DIFFERENTIAL DRIVE MECHANISM.
APPLICATION FILED MAR. 13, 1920. RENEWED NOV. 25, 1921.
1,418,565.
Patented June 6, 1922.
3 SHEETS—SHEET 1.
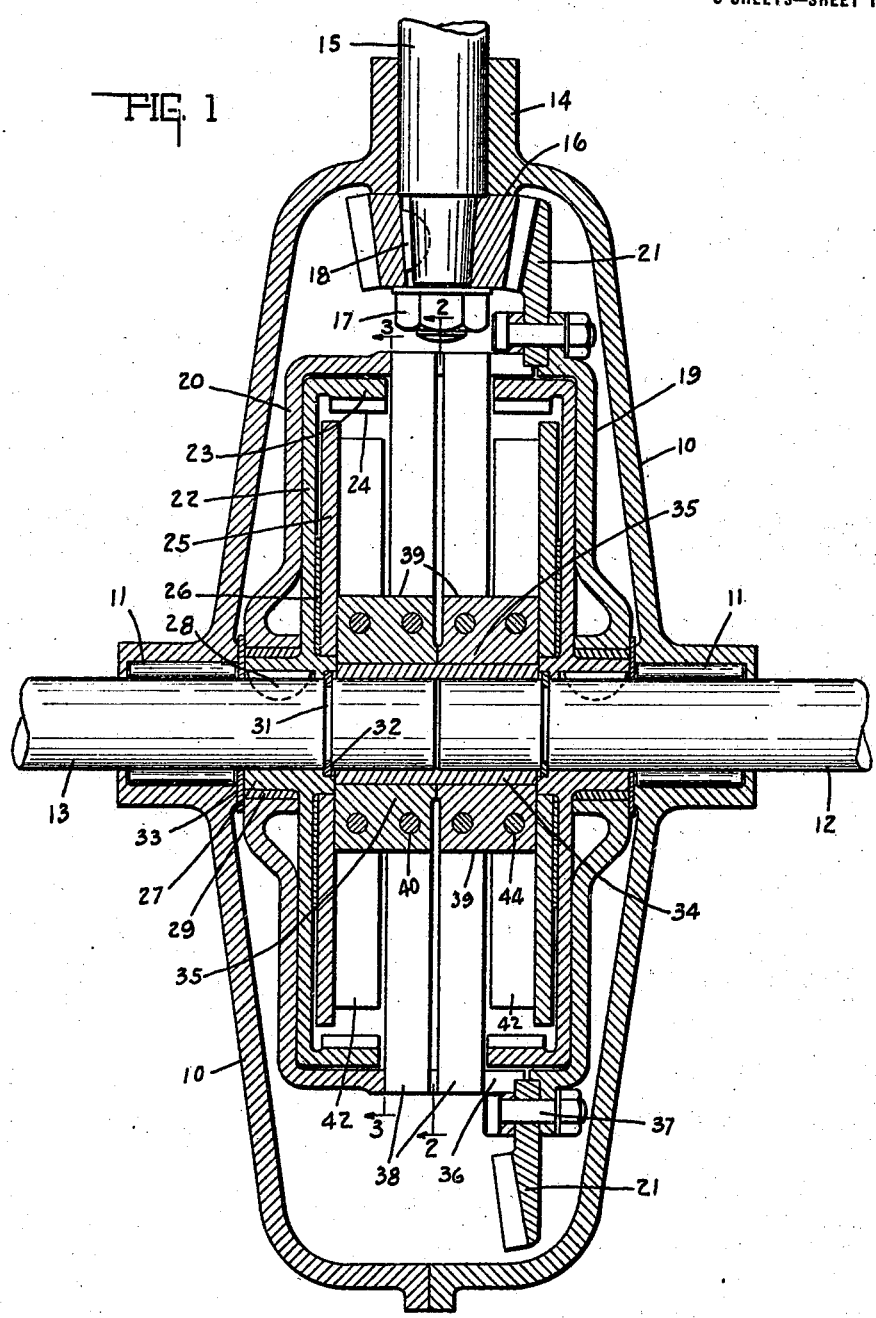
INVENTOR.
WILLIAM H. HARRIS.
BY
Lockwood Lockwood
ATTORNEYS.

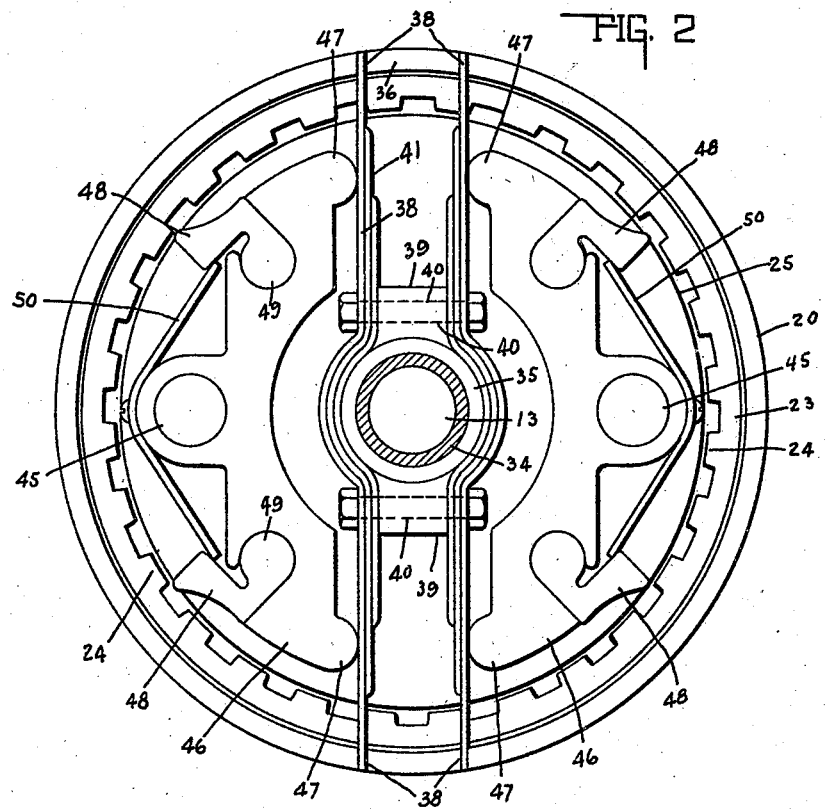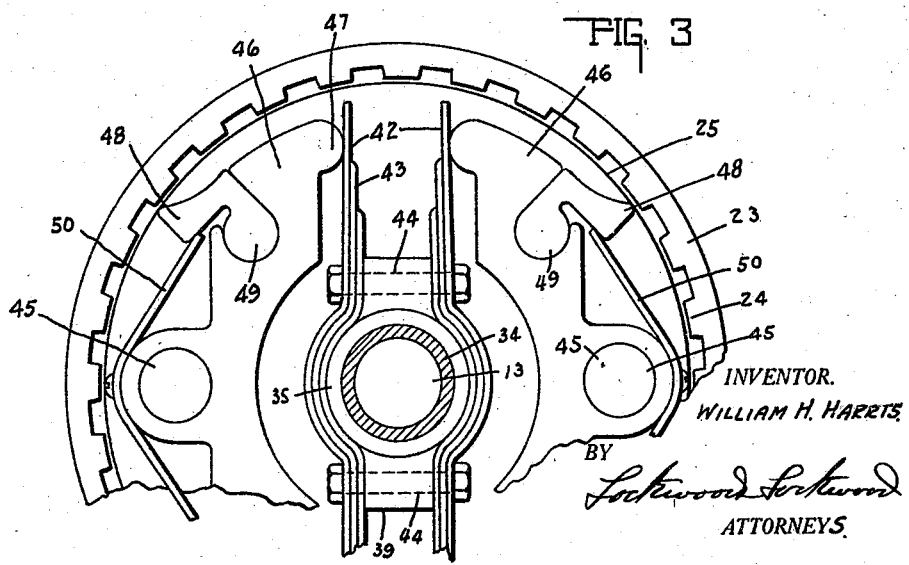

W. H. HARRIS.
DIFFERENTIAL DRIVE MECHANISM.
APPLICATION FILED MAR. 13, 1920. RENEWED NOV. 25, 1921.
1,418,565.
Patented June 6, 1922.
3 SHEETS—SHEET 3.
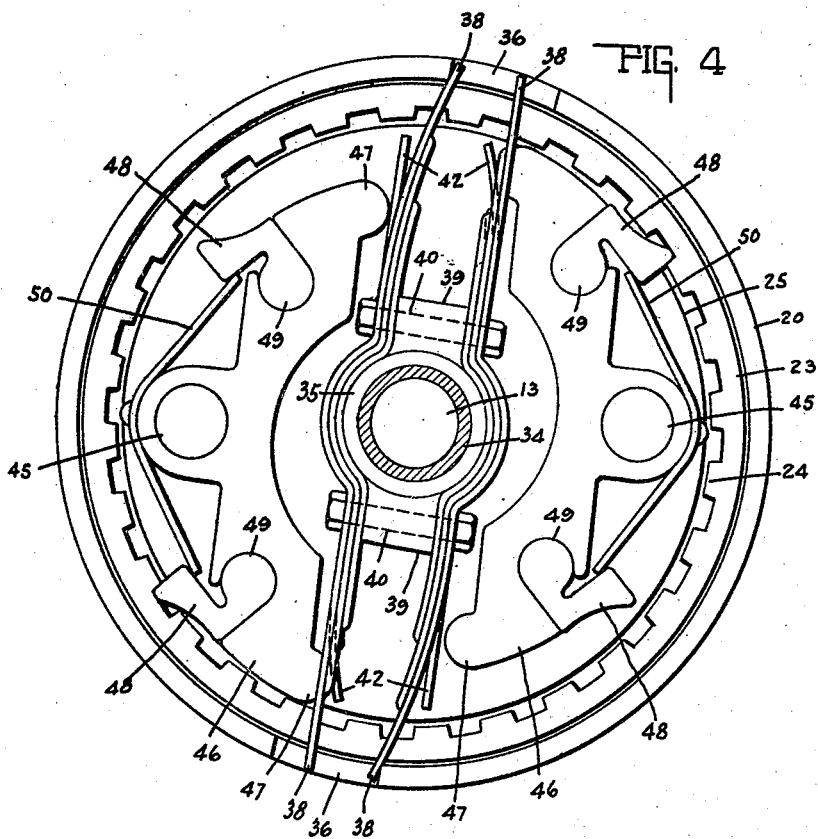
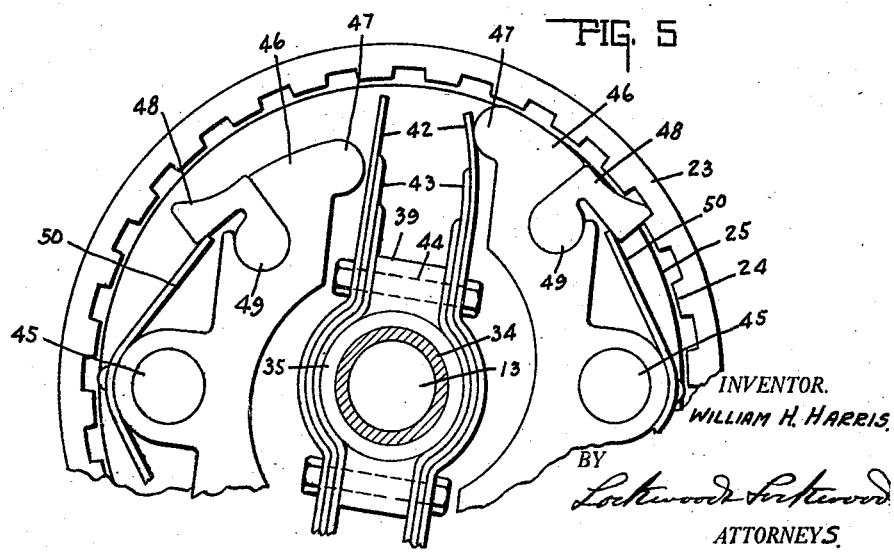
INVENTOR.
WILLIAM H. HARRIS.
BY
Lockwood Lockwood
ATTORNEYS.

UNITED STATES PATENT OFFICE.

WILLIAM H. HARRIS, OF INDIANAPOLIS, INDIANA.

DIFFERENTIAL DRIVE MECHANISM.

1,418,565. Specification of Letters Patent. Patented June 6, 1922.

Application filed March 13, 1920, Serial No. 365,457. Renewed November 25, 1921. Serial No. 517,829.

*To all whom it may concern:*

Be it known that I, WILLIAM H. HARRIS, a citizen of the United States, and a resident of Indianapolis, county of Marion, and State of Indiana, have invented a certain new and useful Differential Drive Mechanism; and I do hereby declare that the following is a full, clear, and exact description thereof, reference being had to the accompanying drawings, in which like numerals refer to like parts.

This invention relates to differential drive mechanism for use with motor vehicles and the like or with any other devices for which it is suitable, arranged so that power will be transmitted constantly to both driven members. In particular this invention is an improvement upon the device and structure shown in the copending application Serial No. 241,517, filed June 24, 1918.

It is well known that in the operation of automobiles and the like, power is not transmitted to both the driven wheels at all times in the standard form of differential gear now being employed, particularly when turning, and the result is serious chiefly because of the loss of power when applied to only one instead of both of said wheels and also when the one of said wheels to which power is being applied is on a slippery surface or in sand. In turning automobiles and the like as at present constructed, the power is transmitted only to the outside wheel. With this invention however the ordinary complex differential gearing is dispensed with and power is capable of being applied at all times to both wheels, but to a variable degree according to the variation in traveling. Therefore, with this invention a double traction effect is secured.

The chief feature of the invention consists in combining with yielding means through which power is applied in a power transmitting mechanism and whereby a differential effect on the driven members result therefrom within a reasonable limit of variation, supplementary means for producing a differential effect when the variation in the travel of the driven means is considerable. With only the yielding means for transmitting power in a differential mechanism, the extent of the differential action is limited to the scope of the elasticity or movement of the yielding means. When, however, the spring action is not sufficient to provide for the differential effect demanded in all emergencies, the machine or motor vehicle to which the same is applied, or in the case of automobiles when turning a very short turn or making a very long turn, such extra differential action is provided for by the improvement herein set forth which permits of ratcheting of the parts.

To the foregoing end there is combined with internally toothed driven members, a driving member within each of the driven members through which power is transmitted from a driving member through a spring structure. Upon each of the two driving members is positioned two kinds of dogs arranged so that one kind of dog will be actuated at one time for driving in a forward direction and the other will be actuated when reverse driving is desired, said dog and said driving member being suitably constructed so that the parts will ratchet when the differential action requires the same.

A further feature of the invention is to construct the parts thereof such that when the same are assembled they will be compactly arranged.

Another feature of the invention is to construct the driving parts thereof such that the tension of the yielding driving connections may be readily varied as desired by adding additional yielding driving parts or subtracting the same.

The full nature of this invention will be understood from the accompanying drawings and the following description and claims.

In the drawings Fig. 1 is a central cross sectional view of the differential driving gear and mechanism. Fig. 2 is a central cross sectional view taken on the line 2—2 of Fig. 1 and in the direction of the arrows, the parts being shown in the neutral or non-driving position. Fig. 3 is a cross sectional view taken on the line 3—3 of Fig. 1 and in the direction of the arrows, the driving casing being omitted, the parts being shown in the neutral position. Fig. 4 is a view similar to Fig. 2 but shows the parts in a driving position. Fig. 5 is a view similar to Fig. 3 and shows the parts in the driving position when the parts are moved to the driving position shown in Fig. 4.

In the drawings 10 indicates a discus-shaped casing provided with a pair of registering and aligned bearings 11 rotatably supporting driven shafts 12 and 13 respectively. At right angles to said bearings 11 is a bearing 14, the same rotatably supporting a driving shaft 15 upon the inner end of which is suitably secured a beveled pinion 16 by means of the nut 17, said pinion being non-rotatably secured to said shaft by means of the key 18, as shown. A cylindrical housing or casing composed of the members 19 and 20 is rotatably supported upon the shafts 12 and 13 respectively. An annular beveled gear 21 is suitably secured to either or both of said housing members for rotating the same when the bevel gear is rotated by the driving shaft 15 through the medium of pinion 16.

Since both halves of the intermediate driving mechanism are substantially identical a description of one will suffice for both. Adjacent cylindrical portion 20 is a plate portion 22, upon the outer periphery of which is formed the annular rack 23 with inwardly extending radial teeth 24. Positioned adjacent the plate 22 is a plate 25 spaced therefrom by an annular friction disk 26, as shown. The plate 22 is provided with a hub portion 27 non-rotatably secured to the shaft 13 by means of a key 28 or the like. Upon the hub portion 27 is positioned a sleeve 29 upon which the cylinder 20 is rotatably supported. Extending beyond the plate portion 22 is a continuation of the hub, upon which the plate 25 is rotatably supported and suitably spaced therefrom by the spacing disk or washer 26. The shaft 13 is herein shown provided with a circular channel 31, the same being adapted to receive a locking ring 32 which limits the longitudinal movement of the hub 27 upon the shaft 13. A suitable washer or disk plate 33 at the other end of said hub bears against the bearing 11 of the discus-shaped casing 10 to limit the longitudinal movement of the hub 27 upon the shaft 13 and also secures the cylinder 20 against longitudinal movement upon the bushing 29.

A suitable sleeve 34 is positioned upon the adjacent abutting ends of the shafts 12 and 13 and upon said sleeve is rotatably mounted a pair of driving blocks 35. The driving cylinder 19 and 20 is suitably slotted longitudinally thereof along the cylindrical periphery as at 36. The structure as shown is provided with a pair of slots 36 diametrically opposite each other and substantially parallel, said slots being herein shown formed in the part 20, the part 19 being suitably secured thereto and simultaneously securing the annular bevel gear 21 thereto by means of the bolt and nut means 37, as shown. In each of the slots 36 there is positioned a pair of spaced parallel spring members 38. In the present instance the spring member 38 extends substantially across the plates and are suitably curved at the middle portion to be seatable adjacent the driving blocks 35, said blocks having extensions 39 through which the bolts 40 extend for securing the springs 38 in parallel relation upon the driving block. Each of the springs 38 is reenforced by suitable similar spring members 41 lying parallel and adjacent thereto. It will be understood that the tension of driving springs 38 may be regulated by adding or substracting additional reenforcing springs 41 as described.

Positioned adjacent the springs 38 are similar spring members 42 similarly reenforced by auxiliary springs 43 and suitably secured in spaced relation upon the block 35 by means of similar bolt means 44. As shown in Figs. 2 and 3 the members 42 and 38 are of unequal length, the members 38 being the longer and engageable in the slot 36 to receive motion from said driving cylinder and transmit the same to the driving block 35 and through said block to the spring 42. Positioned adjacent the driving block 35, as shown clearly in Fig. 1, is the plate 25 upon which is pivotally supported by the pivot studs 45, a pair of driving blocks or carriages 46, each having a driving end portion 47 engageable by the respective portion of the driving spring 42. Secured upon each carriage 46 are a pair of reverse driving dogs or teeth 48, each having a circular portion 49 seatable in a circular recess formed in the driving carriage 46. A suitable spring 50 engages said dogs and is suitably secured to the block 46, as shown. As shown clearly in Figs. 2 and 3, the driving block 46 is symmetrically formed and is provided with a pair of oppositely positioned driving dogs or teeth 48 upon which the spring 50 is simultaneously engageable, as shown clearly in Fig. 2.

One driving position of the mechanism is shown clearly in Figs. 4 and 5. Rotation of the shaft 15 is transmitted through the bevel pinion 16 and bevel gear 21 to the driving cylinders 19 and 20 secured together and provided with the opposite diametrical driving slots 36. The outer ends of the main driving spring members 38 extend into said slots and are positioned therein and adapted to be engaged by the edges of said slots, as shown clearly in Figs. 2 and 4. Fig. 2 illustrates said spring members in the neutral, non-driving or over-running position, while Fig. 4 illustrates said spring members in one of the reversible driving positions. It will be understood that opposite ends of adjacent spring members are simultaneously engageable by the slots, the other ends of said members being non-engageable therein. The movement of the cylinders 20 and 19 flexes certain ends of the springs 38 as shown in Fig. 4, and when said springs are flexed to their limits as associated with the power to be transmitted therethrough, said springs attempt to rotate the driving block or sleeve 35. In Fig. 4, it will be noted that the driving cylinder is rotating in a clockwise direction and this movement flexes the upper left hand spring portion and the lower right hand spring portion 38 thereby attempting to rotate the driving block 35 in a clockwise direction. Since the springs 42 are also secured to the driving block 35 said springs attempt to rotate in a clockwise direction as shown in Fig. 5. In this instance, however, the springs 42 are in engagement with the carriage members or blocks 46. It will be noted that the upper right hand spring member and lower left hand spring member 42 are the flexing members which, as shown in Fig. 4, is opposite from the spring members 38. In the initial rotation of the driving cylinders 19 and 20 the friction disks 26 attempt to retard the rotation of the plate members 25. Upon each of the plate members 25 is pivotally supported a pair of carriage members 46, thus as soon as the plate 25 is frictionally held for an instant it will be understood that the engagement of the spring member 42 upon said carriage members tilts the carriage 46 upon its pivot 45 such that the proper driving teeth or dog 48 of each carriage is projected into the path of the teeth 24. Continued rotation in the starting of the driving movement serves to lock the respective teeth 48 in the driving position and continues to flex the springs 38 and 42 until the same is in the position illustrated in Fig. 5. Then the spring 42 is in position to transmit power through the block 46 and teeth 48 to the teeth 24 of the driven gear. It will be understood that the friction disk is frictionally held by its engagement with the plate 22 supporting the gear 23 and supported by being secured to the shafts 12 and 13 respectively by means of the key 38. Thus the friction disk 26 serves to initiate the tilting movement of the driving carriage 46 but is not sufficient for further driving or retarding movement. Thus, when the respective shaft 12 or 13 rotates slightly faster than the block 35 or slightly slower than said block, it will be understood that the yielding driving connections provided by the spring 42 and 38 insure a slight differential action.

Should the difference in rotation between the foregoing parts require additional differential action the following is provided. For instance in Fig. 4, if the gear 23 were to rotate faster than the sleeve 35 said gear teeth 24 would engage the teeth 48 heretofore driving the same and force said teeth into the non-driving position whereupon said carriage 46 would return to the neutral position shown in Fig. 3 such that the gear 23 could overrun said teeth. When the rotational speed of the gear 23 decreases until the same approximate the rotational speed of the sleeve 35, the friction plate or disk 26 would operate as hereinbefore described and again cause the driving tooth or dog 48 to engage with the gear teeth 24 and drive the gear 23. The spring 50 serves to maintain the dog 48 in the position illustrated in the several figures, whereby said carriage 46 substantially performs all the tilting movement to permit the ratcheting of the teeth with the dogs in the overrunning or differential action.

It will be noted from Figs. 4 and 5 that the parts are symmetrically constructed and that when driven in one direction but half of said parts are operative, the other half being simultaneously movable to the inoperative position. When the rotation of the members is reversed from that illustrated in Figs. 4 and 5, the parts shown in the inoperative position in Figs. 4 and 5 are moved to the operative positions similar to the positions illustrated in Figs. 4 and 5, and the parts illustrated in Figs. 4 and 5 as in the operative position are simultaneously moved to the inoperative position, as indicated by the inoperatively positioned parts in said figures. Thus, in reverse driving the upper right hand tooth 48 in Fig. 5 is moved to the inoperative position, as illustrated by the upper left hand tooth 48 in said figure. Similarly the upper left hand tooth 48 in reverse driving is moved to the driving position as illustrated by the upper right hand tooth in said figure. Similarly the upper left hand spring member 42, which appears to be freely movable between the blocks 46 is moved into engagement with the upper left hand driving portion 47 of the block 46 and the upper right hand spring member 42 is moved to the position intermediate said blocks corresponding to the previous position occupied by the opposite spring member. When the driving shaft 15 is idle it will be understood that the springs 38 are positioned as shown in Fig. 2 and the springs 42 are positioned as shown in Fig. 3, and the respective driving dogs, since the same are maintained by the springs 50, are movable with the carriages 46 into the inactive or neutral position illustrated by both of the foregoing figures.

From the foregoing it will be understood that there is a yielding driving connection formed between the driving block 35 and the driving cylinder 20 and between the driving block 35 and the driving carriage 46, as shown. These yielding driving connections are normally sufficient to provide sufficient differential action such that both axles will be rotated under power at all times. The foregoing yielding driving connection and the differential action of the slot connections as well as the differential action of the ratchet dogs has been described in detail in the preceding paragraphs. To provide additional differential movement in instances where a motor vehicle is making a turn, the dogs 48 ratchet upon the teeth 24 until the respective velocities of the driving cylinders and the shafts 13 and 12 are substantially equal or within the range of the yielding driving connections of the springs 38 and springs 42.

The invention claimed is:

1. In a power transmitting mechanism, a driving member, a driven member enclosed by the driving member and internally toothed, a movable dog for engaging said teeth, and yielding means within the driving member and associated therewith for moving the dog into engaging position and for driving the driven member.

2. In a power transmitting mechanism, a driving member, a driven member enclosed by the driving member and internally toothed, a pair of oppositely located movable dogs for engaging said teeth, and yielding means within the driving member and associated therewith for yieldingly moving the dogs into engaging positions and for driving the driven member.

3. In a power transmitting mechanism, a driving member, a driven member enclosed by the driving member and internally toothed, a pair of oppositely located movable dogs for engaging said teeth, yielding means within the driving member for yieldingly moving the dogs into engaging position, and means for neutrally positioning the dogs when not actuated.

4. In a power transmitting mechanism, a driving member, a plurality of independent driven members enclosed by the driving member and internally toothed, a pair of oppositely located movable dogs for engaging the teeth of each driven member, yielding means within said driving member for yieldingly moving the dogs into engagement with their respective driven members, and means for neutrally positioning the dogs when not actuated.

5. In a power transmitting mechanism, a driving member, a plurality of independent driven members enclosed by the driving member and internally toothed, a pair of oppositely located movable dogs for engaging the teeth of each driven member, yielding means within the driving member for moving said dogs independently into engaging position with their respective driven members when the driving member is driven in either direction, and means for neutrally positioning the dogs when not actuated.

6. In a power transmitting mechanism, a pair of driven members, a driving member adjacent to said members, driving mechanism mounted within said driving member having yielding means through which power is transmitted from said driving member to the adjacent driven member, and a dog carried by the driving mechanism for engaging and carrying power from the driving member to each of the driven members and formed so as to ratchet if a driven member travels faster than the driving mechanism.

7. In a power transmitting mechanism, a driving member, a driven member enclosed by the driving member and internally toothed, a movable dog for engaging the teeth of the driven member and arranged so as to ratchet when the driven member revolves more rapidly than the dog, and yielding means within the driving member for moving the dog into engaging position and for transmitting power from the driving member to the driven member.

8. In a power transmitting mechanism, a driving member, a driven member enclosed by the driving member and internally toothed, a pair of oppositely located movable dogs for engaging the teeth of said driven member and ratcheting when the driven member travels faster than the dog, yielding means within the driving member for yieldingly moving the dogs into engaging position and transmitting power from said driving member to said driven member, and means for neutrally positioning the dogs when not actuated.

9. In a power transmitting mechanism, a driving member, a plurality of independent driven members enclosed by the driving member and each internally toothed, a movable dog for engaging the teeth in each driven member and arranged so as to ratchet when the driven member travels faster than the dog, and yielding means mounted within said driving member for moving said dogs independently into engaging position with their respective driven members and for transmitting power to said driven member.

10. In a power transmitting mechanism, a driving block, a driven member surrounding said driving block and internally toothed, radially projecting spring fingers secured on said block within said driven member, a carriage adjacent said block and spring fingers and adapted to be engaged and actuated by the fingers, and an outwardly movable dog upon said carriage and adjacent the driven member in position to be moved by said carriage through the rotation of the block so as to engage and transmit power to the driven member, said dog being arranged to ratchet when the driven member travels faster than the dog.

11. In a power transmitting mechanism, a pair of driving blocks, a plurality of driven members surrounding the driving blocks and internally toothed, radially projecting spring fingers secured on each of said blocks within the driving member, a carriage within each driven member adjacent the respective block and spring fingers and adapted to be engaged and actuated by the fingers, and an outwardly movable dog upon each carriage adjacent its corresponding driven member in position to be moved by said carriage at the beginnig of the rotation of the block and to engage and drive said driven member, each of said dogs being formed so as to ratchet when the driven member travels faster than the respective blocks.

12. In a power transmitting mechanism, an annular driven member internally toothed, a rotatable driving member within said driven member, a pivotally supported carriage in said driven member, means adjacent said driven member for oscillating said carriage outward, and a dog movably mounted in the carriage in position when actuated to engage the driven member when the carriage is in its outer position, said dog being formed so as to ratchet when the driven member travels faster than the dog.

13. In a power transmitting mechanism, an annular driven member peripherally toothed, a rotatable driving member, a rocking carriage, eccentrically pivoted pair of dogs movably mounted in said carriage and oppositely beveled so that they will ratchet, and a single means for actuating said dogs arranged so that when moved into one position it will actuate one dog and release the other and when moved into another position will reverse the positions of the dogs.

14. In a power transmitting mechanism, an annular driven member peripherally toothed, a rotatable driving member, a pair of rocking carriages positioned at opposite sides of the rotatable driving member, a pair of dogs movably mounted in each carriage member and oppositely beveled so that they will ratchet, and means for rocking said carriages in one position to engage one pair of dogs and release the other pair of dogs and when reversely rocked release the actuated dog and actuate the other dogs.

15. In a power transmitting mechanism, an annular driven member peripherally toothed, a pivotally supported carriage member, a pair of dogs movably mounted in said carriage member and oppositely beveled so that they will ratchet, a driving member and a block yieldingly mounted within said driving member so that when the driving member is started in either direction said block will rock the carriage member relative to the driven member, said carriage being so formed that it will engage and release said dogs and the driven member when rocked in alternate directions.

16. In a power transmitting mechanism, an annular driven member peripherally toothed, a driving member, a pivotally supported carriage member, a pair of dogs pivotally and substantially radially mounted in said carriage member and oppositely beveled so that they will ratchet, a rocking block formed so that when rocked in one direction will actuate one dog and release the other dog and when reversely rocked it will release the actuated dog and actuate the other dog, and a driving member for rotating said block.

17. In a power transmitting mechanism, a driving member, a driving sleeve, a driven member surrounding the driving sleeve and internally toothed, an outwardly movable dog for engaging the teeth of the driven member and arranged so as to ratchet when the driven member revolves more rapidly than the dog, yielding means on said sleeve for moving the dog in engaging position and transmit power from the sleeve to the driven member, and a second yielding connection between the driving member and the driven members.

18. In a power transmitting mechanism, a driving member, a driving sleeve, a driven member surrounding the driving sleeve and internally toothed, a radially movable dog for engaging the teeth of the driven member and arranged so as to ratchet when the driven member revolves more rapidly than the dog, yielding means on said sleeve for moving the dog in engaging position and transmit power from the sleeve to the driven member, and a second yielding connection between said driving member and said driving mechanism.

19. In a power transmitting mechanism, a driving member, a driving sleeve, a driven member surrounding the driving sleeve and internally toothed, an outwardly movable dog for engaging the teeth of the driven member and arranged so as to ratchet when the driven member revolves more rapidly than the dog, yielding means on said sleeve for moving the dog in engaging position and transmit power from the sleeve to the driven member, and a second yielding connection between the driving member and the driving sleeve.

20. In a power transmitting mechanism, a cylindrical driving member, a pair of axially aligned driven shafts having their actuated ends extending within the driving cylinder, a toothed member within said driving cylinder and upon each of said shafts and rotatable therewith, a pair of adjacent driving sleeves positioned between said toothed members, a yielding driving connection between each of said sleeves and the enclosed cylinder, a carriage member positioned between each sleeve and the toothed member, a pair of dogs positioned upon each of said carriage members and alternately engageable with an annular toothed gear to rotate the same in opposite directions when the driving cylinder is oppositely rotated, and a yielding connection between said sleeve and said carriage.

21. In a power transmitting mechanism, a cylindrical driving member, a pair of axially aligned driven shafts having their actuated ends extending within the driving cylinder, a toothed member within said driving cylinder and upon each of said shafts and rotatable therewith, a pair of adjacent driving sleeves positioned between said toothed members, a yielding driving connection between each of said sleeves and the enclosed cylinder, a pair of carriages positioned at opposite sides of each sleeve, a pair of dogs in each carriage and alternately engageable with the toothed member adjacent thereto to rotate the same in opposite directions when the driving cylinder is oppositely rotated, and a yielding connection between said sleeves and respective pairs of oppositely positioned carriages.

22. In a power transmitting mechanism, an enclosed driving member provided with a pair of longitudinal slots opposite each other, a driven member within said driving member and having inwardly and radially extending teeth, a driving block concentric with said driving member and within the same, a spring member having its opposite ends seatable in said opposite slots and its central portion secured to the driving block, a supporting member rotatable within said driving member and adjacent the driving block, a carriage member pivotally supported upon said supporting member, and spring means secured to said block engaging opposite ends of said second mentioned spring means when the driving member is oppositely rotated, and a pair of dogs supported by said carriage, each dog alternately being engageable with the annular toothed member and withdrawable therefrom when the respective opposite ends of said carriage member are engaged by the second mentioned spring means.

23. In a power transmitting mechanism, a driving cylinder, including an axially aligned driving member, a driven member surrounding said driving member and internally toothed and enclosed by said cylinder, a radially projecting finger secured to said driving member within said driven member, a carriage, a radially movable dog supported on said carriage and actuated by said finger to engage and drive said driven member by said driving member, and means for frictionally retarding said carriage to project said dog into engagement with said internally toothed driven member.

24. In a power transmitting mechanism, a driving cylinder, including an axially aligned driving member, a driven member surrounding said driving member and internally toothed and enclosed by said cylinder, a radially projecting finger secured to said driving member within said driven member, a carriage, a radially movable dog supported on said carriage and actuated by said finger to engage and drive said driven member by said driving member, and means for frictionally retarding said carriage to project said dog into engagement with said internally toothed driven member, said dog being formed so as to ratchet when the driven member travels faster than the driving member.

25. In a power transmitting mechanism, a driving cylinder, including an axially aligned driving member, a driven member surrounding said driving member and internally toothed and enclosed by said cylinder, a radially projecting finger secured to said driving member within said driven member, carriage means, a pair of radially movable dogs supported on said carriage means and actuated by said finger to engage and reversibly drive said driven member by said driving member when the latter is reversed, and means for frictionally retarding said carriage means to project either of said dogs into engagement with said internally toothed driven member.

26. In a power transmitting mechanism, a driving cylinder, including an axially aligned driving member, a driven member surrounding said driving member and internally toothed and enclosed by said cylinder, a radiallly projecting finger secured to said driving member within said driven member, carriage means, a pair of radially movable dogs supported on said carriage means and actuated by said finger to engage and reversibly drive said driven member by said driving member when the latter is reversed, and means for frictionally retarding said carriage means to project either of said dogs into engagement with said internally toothed driven member, said dogs being formed so as to ratchet when the driven member travels faster than the driving member.

27. In a power transmitting mechanism, a driving cylinder, including an axially aligned driving member, a driven member surrounding said driving member and internally toothed and enclosed by said cylinder, radially projecting finger means secured to said driving member within said driven member and extending diametrically thereof, carriage means within said driven member, a plurality of pairs of diametrically positioned radially movable dogs supported on said carriage means and actuatable by said finger means for causing a pair of said dogs to engage and drive said driven member and be driven by said driving member, and means for frictionally retarding said carriage means to project a pair of said dogs into engagement with said internally toothed driven member to drive the same.

28. In a power transmitting mechanism, a driving cylinder, including an axially aligned driving member, a driven member surrounding said driving member and internally toothed and enclosed by said cylinder, radially projecting finger means secured to said driving member within said driven member and extending diametrically thereof, carriage means within said driven member, a plurality of pairs of diametrically positioned radially movable dogs supported on said carriage means and actuatable by said finger means for causing a pair of said dogs to engage and drive said driven member and be driven by said driving member, and means for frictionally retarding said carriage means to project a pair of said dogs into engagement with said internally toothed driven member to drive the same, said dogs being formed so as to ratchet when the driven member travels faster than the driving member.

In witness whereof, I have hereunto affixed my signature.

WILLIAM H. HARRIS.